United States Patent
Landron-Rivera et al.

(10) Patent No.: US 11,024,032 B1
(45) Date of Patent: Jun. 1, 2021

(54) SYSTEM AND METHOD FOR GENERATING SYNTHETIC OVERHEAD IMAGERY BASED ON CLUSTER SAMPLING AND SPATIAL AGGREGATION FACTORS

(71) Applicants: Brian A. Landron-Rivera, San Juan, PR (US); Leslie De Jesus-Lebron, San Juan, PR (US); Christian G Gonzalez, San Juan, PR (US); Carlos M Melendez, San Juan, PR (US); Vincent Tompkins, San Juan, PR (US)

(72) Inventors: Brian A. Landron-Rivera, San Juan, PR (US); Leslie De Jesus-Lebron, San Juan, PR (US); Christian G Gonzalez, San Juan, PR (US); Carlos M Melendez, San Juan, PR (US); Vincent Tompkins, San Juan, PR (US)

( * ) Notice: Subject to any disclaimer, the term of this patent is extended or adjusted under 35 U.S.C. 154(b) by 28 days.

(21) Appl. No.: 16/528,118

(22) Filed: Jul. 31, 2019

Related U.S. Application Data

(60) Provisional application No. 62/802,518, filed on Feb. 7, 2019.

(51) Int. Cl.
  *G06T 7/11* (2017.01)
  *G06T 7/73* (2017.01)
  *G06T 7/194* (2017.01)

(52) U.S. Cl.
  CPC ............... *G06T 7/11* (2017.01); *G06T 7/194* (2017.01); *G06T 7/73* (2017.01); *G06T 2207/10032* (2013.01)

(58) Field of Classification Search
  CPC ... G06T 7/11; G06T 7/194; G06T 7/73; G06T 2207/10032
  USPC .......................................................... 382/173
  See application file for complete search history.

(56) References Cited

U.S. PATENT DOCUMENTS

| | | | | |
|---|---|---|---|---|
| 8,300,935 | B2* | 10/2012 | Distante | G06T 7/20 382/173 |
| 8,903,167 | B2* | 12/2014 | Kohli | G06K 9/6255 382/155 |
| 2012/0114240 | A1* | 5/2012 | Yamada | G06T 7/11 382/173 |
| 2015/0269439 | A1* | 9/2015 | Versace | G06T 7/194 382/103 |
| 2017/0061625 | A1* | 3/2017 | Estrada | G06N 3/0454 |

OTHER PUBLICATIONS

Faber TL, Folks RD. Computer Processing Methods for Nuclear Medicine Images. J Nucl Med Technol,22:5-9. (Year: 1994).*

(Continued)

*Primary Examiner* — Nancy Bitar
*Assistant Examiner* — Daniella M. DiGuglielmo
(74) *Attorney, Agent, or Firm* — Luis Figarella

(57) ABSTRACT

Mechanisms and processes for enhancing limited datasets for use in training or deep learning models are discussed. Such creation generates synthetic overhead imagery based on cluster sampling and spatial aggregator factors (SAFs). The implementation accomplishes this by generating Synthetic images created by cropping objects from original images and inserting them into uniform, natural or synthetic backgrounds. The objects are selected from clusters based on pixel distribution similarity, and through SAFs mining then used for the synthetic data generation.

6 Claims, 4 Drawing Sheets

(56) References Cited

OTHER PUBLICATIONS

Melnykov I, Melnykov V. On K-means algorithm with the use of Mahalanobis distances. Statistics & Probability Letters,84:2-4. (Year: 2014).*

Yip K, Zhao F. Spatial Aggregation: Theory and Applications. J Artif Intell Res,5:5-19. (Year: 1996).*

Jeffery C, Ozonoff A, Pagano M. The effect of spatial aggregation on performance when mapping a risk of disease. Int. J. Health Geogr,13:4. (Year: 2014).*

* cited by examiner

SYSTEM AND METHOD FOR GENERATING SYNTHETIC OVERHEAD IMAGERY BASED ON CLUSTER SAMPLING AND SPATIAL AGGREGATION FACTORS

CROSS-REFERENCE TO RELATED APPLICATIONS

This application claims priority to U.S. Provisional patent application Ser. No. 62/802,518 titled "A method for generating synthetic overhead imagery based on cluster sampling and spatial aggregation factors", filed on Feb. 7, 2019 the disclosure of which is herein incorporated by reference in its entirety.

PATENTS CITED

The following documents and references are incorporated by reference in their entirety, Estrada et al (U.S. Pat. No. 9,767,565), Holzer et al (U.S. Pat. No. 10,152,825), Chandler (U.S. Pat. Pub. No. 2015/0379422), Versace (U.S. Pat. Pub. No. 2015/0269439), Hussam (U.S. Pat. Pub. No. 2003/0050927) and Agrawal (U.S. Pat. Pub. No. 2007/0237417).

FIELD OF THE INVENTION

The present invention relates to the field of image analysis, and more particularly to the generation of synthetic overhead imagery based on cluster sampling and spatial aggregation factors.

DESCRIPTION OF THE RELATED ART

Deep learning has become a key player in modern computer vision with supervised learning. To enable training of deep learning models a large amount of annotated data is required. This work describes a method and system for generating synthetic overhead imagery based on existing datasets. The proposed approach considers the background pixel, spatial, object count, and class distributions of existing images for generating synthetics.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention. In one aspect the invention is about a computer-implemented method for generating synthetic overhead imagery based on cluster sampling and Spatial Aggregation Factors (SAFs), with said method comprising: accessing a satellite image dataset, within one or more computer servers, where each said image has a collection of pixels, with each pixel being a precise coordinate within its corresponding image and a function that maps said coordinates to pixel content and each said image has one or more annotations identifying objects of interest, wherein each said object of interest is placed within a bounding box or a tight polygon that encompasses both said object's pixels as well as other nearby background pixels Regions of Interest (ROIs) and generating a synthetic image through cluster sampling of objects from an existing dataset, where objects are clustered according to their pixel distributions. In another aspect using K-means clustering, the similarity in pixel distributions between object backgrounds and clusters is determined by said one or more computer servers based on thresholding the Mahalanobis distance.

In yet another aspect generate, by said one or more computer servers, a collection of clustered objects based on the background distribution of the entire dataset and specifically: let $ROIs_k \in ROIs_D$ be a set of k ROIs used for initial cluster centroid computations, let $Centroid_k = \{(\mu_k, C_k): \mu_k$ is the background pixel mean of each $ROIs_k$ selected for initial centroids and computed as $$\frac{1}{|Background_{jk}|} \sum_{i=0}^{|Background_{jk}|}$$

$F(Background_{ji})$ and $C_k$ its corresponding covariance matrix$\}$ be the set of cluster centroids to optimize with K-means clustering and perform K-means clustering of all object background pixel means using the Mahalanobis distance between each background pixel mean and the proposed centroids to obtain optimized background distribution centroids.

In another aspect, for each said image labeled with polygons, a corresponding Spatial Aggregation Factors (SAFs) is represented as an object count and a graph, wherein in each said graph each node corresponds to an object and each vertex to the pixel distance between each object in said image. In yet another aspect, using at least one satellite image and one or more associated SAF graphs for said image, performing the following process for each SAF: for each object present in the chosen SAF selecting one or more qualified objects from the closest background cluster to replace the original object in said image, filling original object pixels not occupied by said qualified objects with the original background pixel mean, blurred, blended or corrected with a complementing synthetic pixel generator and choosing spatial distribution of objects within said synthetic image by imitating an existing SAF graph and positions in a random buffer so as to not use a spatial distribution twice until the resulting synthetic image has an equal amount of objects as the chosen SAF.

In another aspect, calculate the Mahalanobis distance between each pixel in a background and each cluster centroid, assign a centroid to each pixel, and then assign backgrounds to the centroid with the highest pixel count. Using at least one satellite image and one or more associated SAF graphs for said image, performing the following process for each SAF: for each object present in the chosen SAF selecting one or more qualified objects from the closest background cluster to replace the original object in said image, filling original object pixels not occupied by said qualified objects with the original background pixel mean, blurred, blended or corrected with a complementing synthetic pixel generator; and choosing spatial distribution of objects within said synthetic image by imitating an existing SAF graph and positions in a random buffer so as to not use a spatial distribution twice until the resulting synthetic image has an equal amount of objects as the chosen SAF.

In one aspect, the invention is about a non-transitory computer-readable medium embodying a program executable by at least one computing device, the program when executed causing said at least one computing device to do the following: accessing a satellite image dataset, within one or more computer servers, where each said image has a collection of pixels, with each pixel being a precise coordinate within its corresponding image and a function that maps said coordinates to pixel content and each said image has one or more annotations identifying objects of interest, wherein each said object of interest is placed within a bounding box or a tight polygon that encompasses both said object's pixels as well as other nearby background pixels Region of Interest (ROI); and generating a synthetic image through cluster sampling of objects from an existing dataset, where objects are clustered according to their pixel distributions.

In one aspect, the invention is about a computer-implemented system for generating synthetic overhead imagery based on cluster sampling and Spatial Aggregation Factors, said system comprising: one or more computer servers hosting a satellite image dataset, where each said image has a collection of pixels, with each pixel being a precise coordinate within its corresponding image and a function that maps said coordinates to pixel content and each said image has one or more annotations identifying objects of interest, wherein each said object of interest is placed, by said one or more computer servers, within a bounding box or a tight polygon that encompasses both said object's pixels as well as other nearby background pixels Region of Interest (ROI) and generating by said one or more computer servers a synthetic image through cluster sampling of objects from an existing dataset, where objects are clustered according to their pixel distributions.

Other features and advantages of the present invention will become apparent upon examining the following detailed description of an embodiment thereof, taken in conjunction with the attached drawings.

Figure 1:
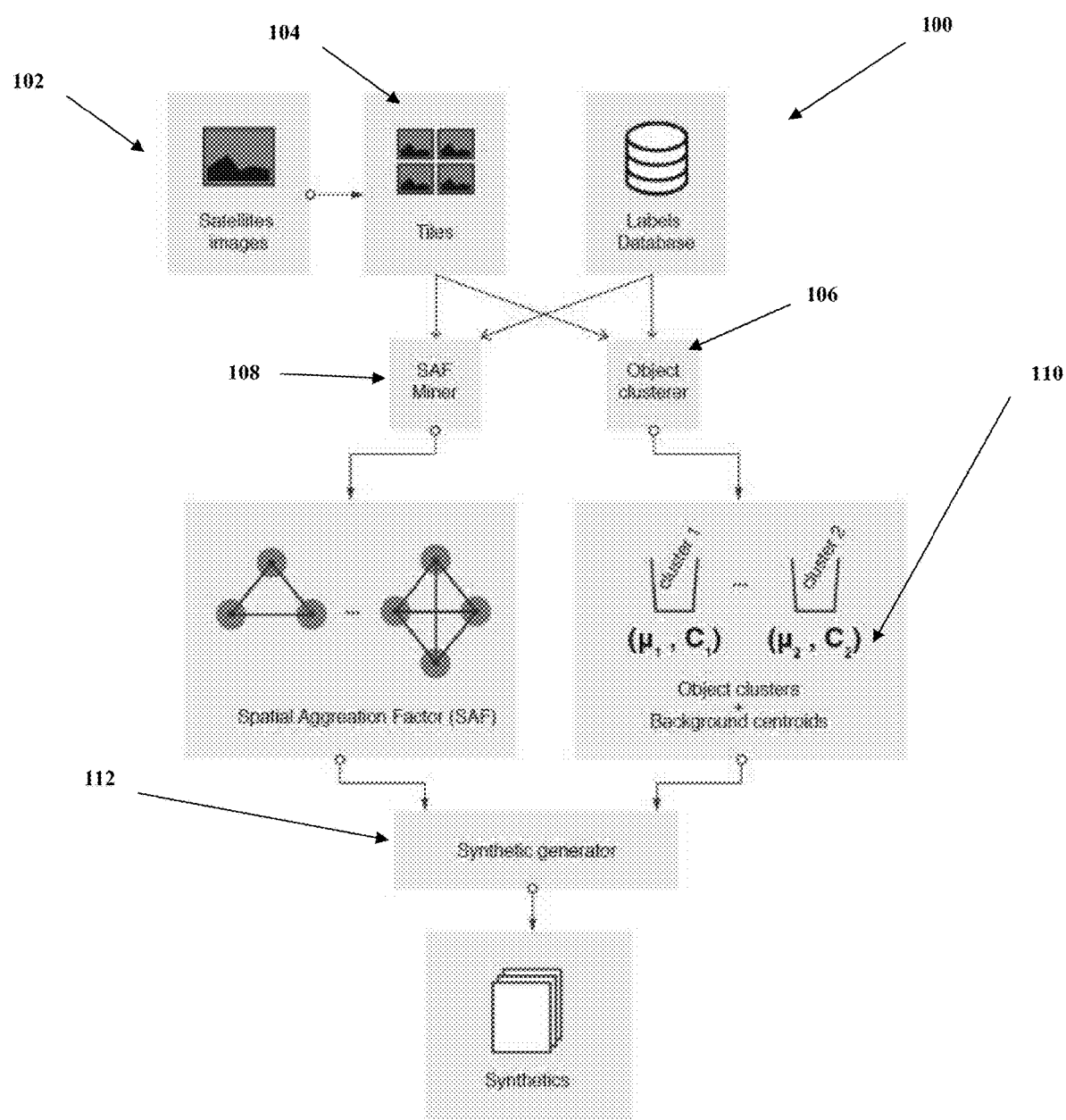
FIG. 1 shows components of the proposed oversampling technique, according to an exemplary embodiment of the invention.

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, such that other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what the authors assert and that the applicants reserve the right to challenge the accuracy and pertinence of the cited documents. It will be clearly understood that, although a number of prior art publications are referred to herein, the references do not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transactions unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

The proposed method relies on using cluster sampling, where objects are assigned to each cluster based on the Mahalanobis distance (MD) between the mean of the object's background pixels and cluster-level pixel distributions, and object-based oversampling using Spatial Aggregation Factors (SAFs). Choosing data from one cluster for a particular synthetic will imitate the uniform nature of background pixels present in overhead imagery. SAFs will support the selection of object types, count, and spatial distribution that best matches a natural setting for each synthetic.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols.

A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof.

In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems.

This solution is most beneficial to the Geospatial Intelligence community where the analysis of overhead imagery is crucial to daily operations and there is a high cost involved in generating datasets for such tasks.

The following section contains information about the significant properties of overhead imagery exploited as part of the proposed method. The following section details our method for generating synthetic imagery to be used in spatiotemporal analysis with object detection models.

The following are properties of overhead imagery that are exploited in our approach: overhead images tend to present a similar background pixel distribution for objects that are close together (e.g. rural area has a higher density of background pixels capturing vegetation as urban settings have a higher density of background pixels capturing concrete or man-made structures).

There is often more than one type of landscape per image (e.g. urban, suburban, and rural communities within the same image). The spatial distribution of objects tends to be uniform between units of a particular scene or landscape (e.g. where there is a hospital there most likely are ambulances and a parking lot close by). Object counts within an area of interest often correlate to certain types of landscape.

The proposed approach 100 is seen in FIG. 1 and is based on enhancing limited datasets. Synthetic images 104 to complement the original images 102 are generated by cropping objects from originals and inserting them into a uniform, natural, or synthetic background. Objects are selected from clusters 106 based on pixel distribution similarity. SAF mining 108 and usage will also play an important role in choosing objects for oversampling. Below we briefly detail the approach for the task of synthetic data generation. Diagram 100 illustrates the main components of the solution.

For the scope of this work we employ a combination of Mahalanobis distance-based K-means clustering to optimize background distribution centroids (amount chosen a priori) and thus perform an informed oversampling of objects by replacement. The use of Mahalanobis distance in K-means clustering 110 is well understood. Synthetic image generation 112 by pixel interpolations, such as the synthetic minority oversampling technique (SMOTE), are well known and various approaches are documented below.

Generative models have been widely used to generate low-dimensional synthetic image data based on auto-encoders, stochastic neural networks, and recurrent neural networks. These approaches have benefited from recent advances in neural network implementations in order to generate higher dimensional complex images but do not resemble the work taught here.

In previous embodiments, others have superimposed objects of interest on parts of images considered to be background support surfaces where an existing object is found. In addition to superimposing objects, another similarity is that because they consider background data to inform the superimposition. Some others have replaced 3D object models to replace real objects and their position is informed by real object pose.

These and other approaches differ from ours firstly because we propose a method for synthetic overhead imagery generation and secondly because objects are only chosen for replacement if they are determined to be on top of a certain type of background (support surfaces, such as tables and counter tops, which could potentially be any surface) considered to be similar to the background of the object being replaced. In addition, in one embodiment, the position of the real object is informed by real object pose and not by neighboring background pixel distribution.

In one embodiment, the approach for generating synthetic satellite imagery assumes there is an available satellite image dataset complete with segmentation and bounding box type annotations. The following data is required to perform the steps involved in our method:

Step 1 Let D={I: each element I represents an image collected with an overhead optical sensor}.

Step 2 Let $P_I$={(R, G, B)∈$\mathbb{R}^3$: R, G, and B contain an unmixed numeric representation of a solid color} be the set of pixels in an image I Step 3 Let $Coords_I$={(x,y)∈$\mathbb{R}^2$: 0≤x≤w and 0≤y≤h, w=image width and h=image height} be the set of coordinates used to localize pixels in image I.

Step 4 Let F(x,y): $Coords_I$→$P_I$ be a bijective function that maps pixel coordinates from a domain Coords to its co-domain P.

Step 5 Let $B_{Ij}$={(x,y)∈$\mathbb{R}^2$: 0≤x≤$w_{box}$ and 0≤y≤$h_{box}$, $w_{box}$=bounding box width and $h_{box}$=bounding box height and 0≤j≤number of labels in image I} be the set of pixel coordinates contained in any given bounding box k from image I.

Step 6 Let $M_{Ij}$={(x,y)∈$\mathbb{R}^2$: 0≤x≤$w_{box}$ and 0≤y≤$h_{box}$, $w_{box}$=bounding box width and $h_{box}$=bounding box height and 0≤j≤number of labels in image I} be the set of pixel coordinates contained in any given segmentation mask j in image I.

Step 7 Let $Background_{Ij}$={(x,y)∈$B_{Ij}$−$M_{Ij}$: 0≤j≤number of labels in image I∈D} be the set of all background pixel coordinates that make up label j in image I from dataset D.

Step 8 Let ROIs$_D$={F(Background$_{Ij}$): 0≤j≤number of labels in image I∈D} be the set of all background pixels of each label j present in each image I in dataset D.

Figure 2:
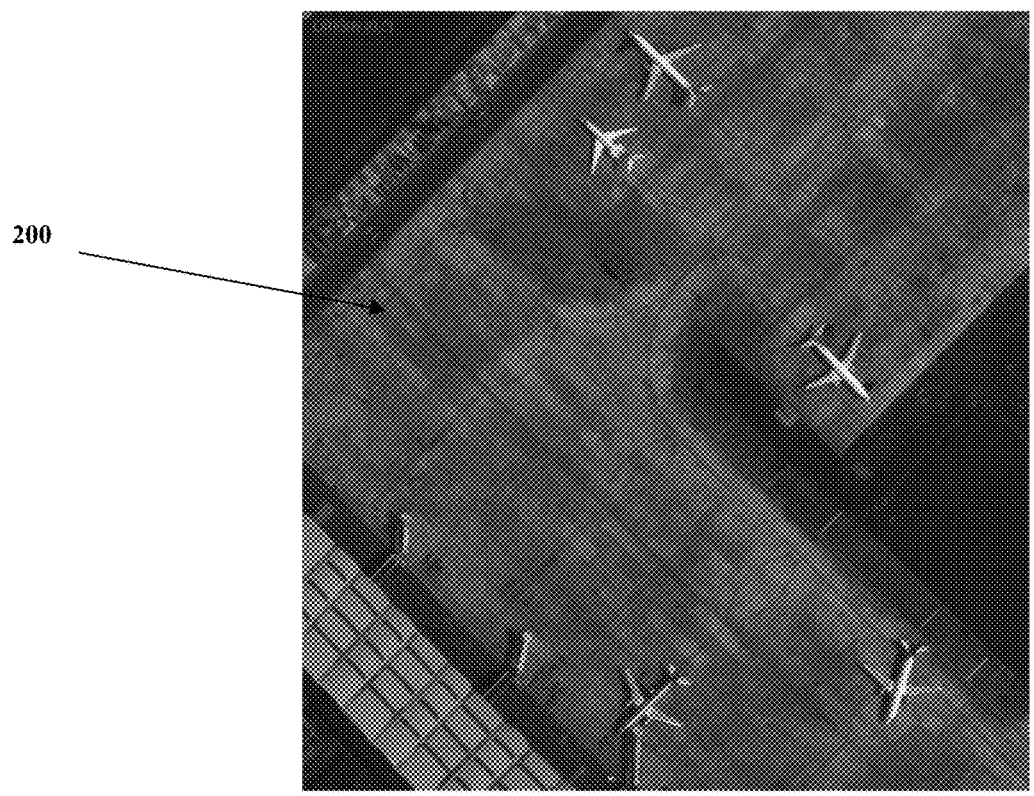
FIG. 2 shows an example of a satellite image.

In one embodiment, and to further clarify the data needed for the method, refer to the satellite image 200 in FIG. 2. Suppose it has a resolution of 512×512 pixels where each pixel occupies a fixed position within an image. In most computing systems pixel positions follow a Cartesian axes whose origin is found in the top left corner. A dataset D (refer to Step 1 in Assumptions section above) can be made up of a set of satellite images I.

Each image will have:
1. a collection of pixels (refer to Step 2),
2. each pixel a precise coordinate within its corresponding image I (refer to Step 3), and
3. a function that maps coordinates to pixel content as in Step 4.

Figure 3:
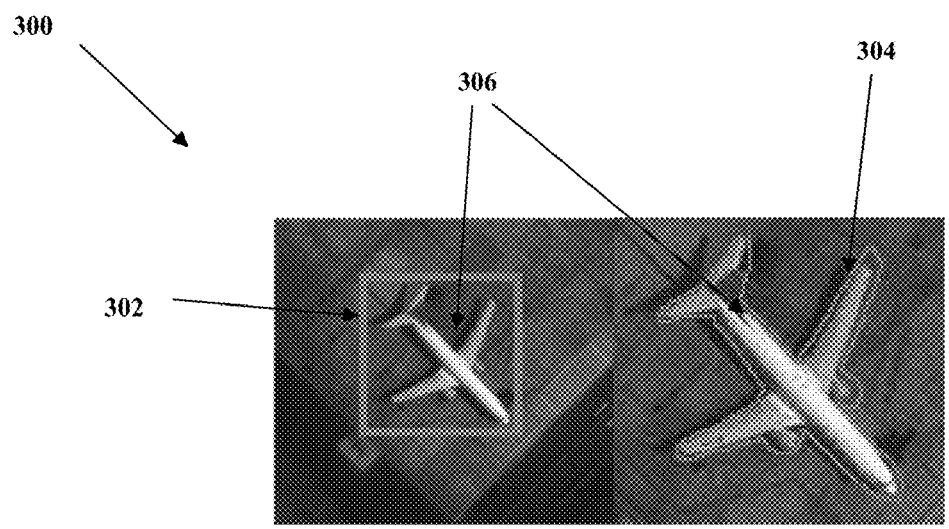
FIG. 3 shows the difference between a bounding box vs. a segmentation technique, according to an exemplary embodiment of the invention.

FIG. 3 illustrates this concept 300. In it, we can then identify the coordinates of a bound box 302 or a tight polygon 304 (segmentation) to encompass an airplane 306. Set BIj from Step 5 would include all pixel coordinates contained within the bound box 302. Set MIj from Step 6 would include all pixel coordinates contained within the tight polygon 304 around the airplane outline.

Figure 4:
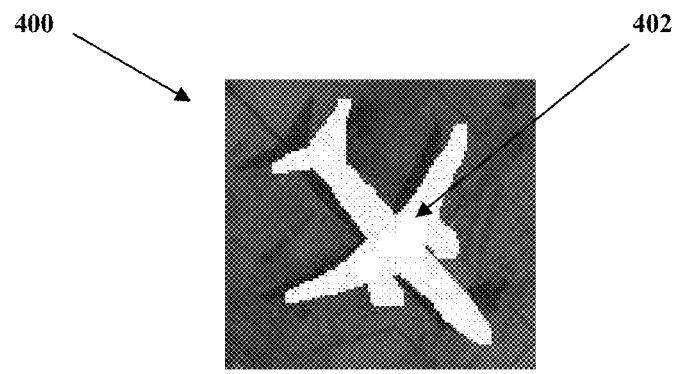
FIG. 4 shows a segmented airplane extracted from a satellite imagery, according to an exemplary embodiment of the invention.

FIG. 4 helps visualize a group of background pixels 400 that have been isolated between the airplane's bound box and its segmentation 402, which would correspond to set BackgroundIj described in Step 7.

In one embodiment, proposed Regions of Interest (ROIs) (set ROIs$_D$ from Step 8 above) are made up of groups of background pixels. For each object enclosed within a bounding box we propose an ROI to represent the group of background pixels included in the bounding box that are not actually part of the object.

To mimic the regional backgrounds present in overhead imagery, the objects selected to be part of a particular synthetic are chosen from clusters of objects with similar pixel distribution. Given a labeled dataset, we cluster different types of pixel distributions to perform cluster sampling of objects using K-means clustering. Similarity in pixel distributions between object backgrounds and clusters will be based on thresholding the Mahalanobis distance, whose equation is shown below.

$$D_M(\bar{x},\mu)=\sqrt{(\bar{x}-\mu)^T C^{-1}(\bar{x}-\mu)}$$

Where $\bar{x}$ is the background pixel mean of the object of interest, $\mu$ would be each existing cluster's background pixel mean, and C the covariance matrix of pixels within each cluster.

This step will result in a collection of clustered objects based on the background distribution of the entire dataset. Each cluster will be made up of objects with a similar background pixel distribution. The following rules describe our approach for this portion of the method:
1. Let ROIs$_k$∈ROIs$_D$ be a set of k ROIs used for initial cluster centroid computations.
2. Let Centroid$_k$={($\mu_k$, $C_k$): $\mu_k$ is the background pixel mean of each ROIs$_k$ selected for initial centroids and computed as $$\frac{1}{|Background_{Ik}|} \sum_{i=0}^{|Background_{Ik}|}$$

F(Background$_{Ii}$) and $C_k$ its corresponding covariance matrix} be the set of cluster centroids to optimize with K-means clustering.
3. Perform K-means clustering of all object background pixel means using the Mahalanobis distance between each background pixel mean and the proposed centroids to obtain optimized background distribution centroids.

In another embodiment, we calculate the Mahalanobis distance between each pixel in a background and each cluster centroid, assign a centroid to each pixel, and then assign backgrounds to the centroid with highest pixel count.

Figure 5:
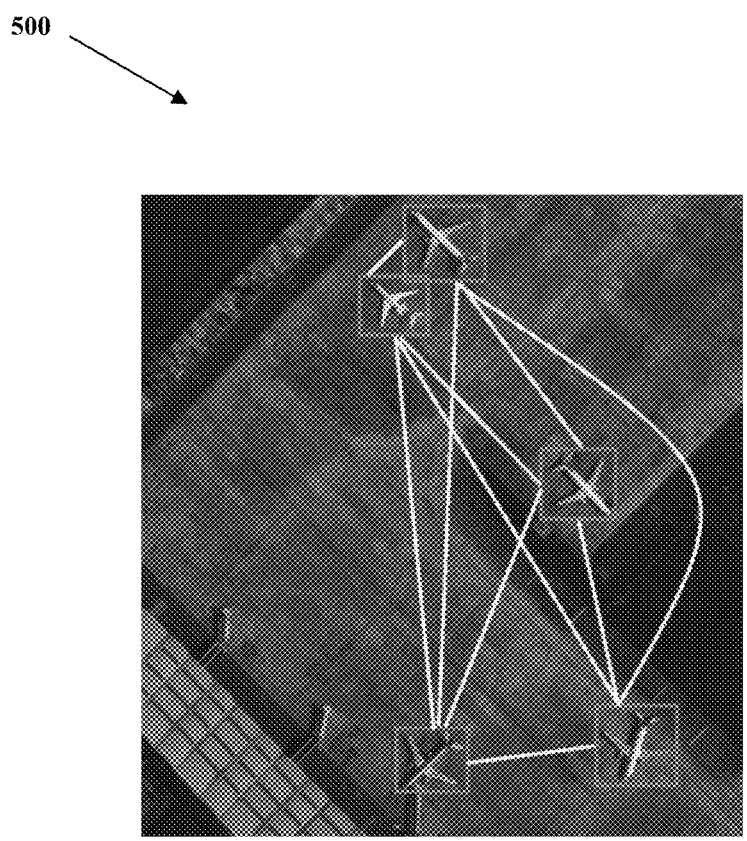
FIG. 5 shows an illustration of a Spatial Aggregation Factors (SAFs) graph mined from a satellite image and its objects annotations, according to an exemplary embodiment of the invention.

SAFs are then mined from labeled data. For each image labeled with bounding boxes, its corresponding SAF is represented as an object count and a graph where each node will correspond to an object and each vertex to the pixel distance between each object in the image. Objects in a SAF will be further clustered based on their background pixel distribution to obtain a list of clustered objects for each SAF. This will be done to extract the different background pixel distributions present in each individual image. FIG. 5 illustrates a SAF graph mined from a satellite image 500.

In one embodiment, to generate synthetic data, a satellite image and its SAF, a graph will be chosen for each synthetic. The following rules describe the proposed method for actual synthetic image generation based on replacing objects from the selected image:
1. For each object present in the chosen SAF a qualified object from the closest background cluster will be selected to replace the original object in the image.
2. Original object pixels not occupied by a qualified object are filled with the original background pixel mean, blurred, blended, or corrected with a complementing synthetic pixel generator.
3. Spatial distribution of objects within synthetic images is chosen by imitating an existing SAF graph and the positions randomly buffered so as to not use a spatial distribution twice.
4. This process is repeated for all objects in the chosen SAF until the resulting synthetic image has an equal amount of objects as the chosen SAF.

Figure 6:
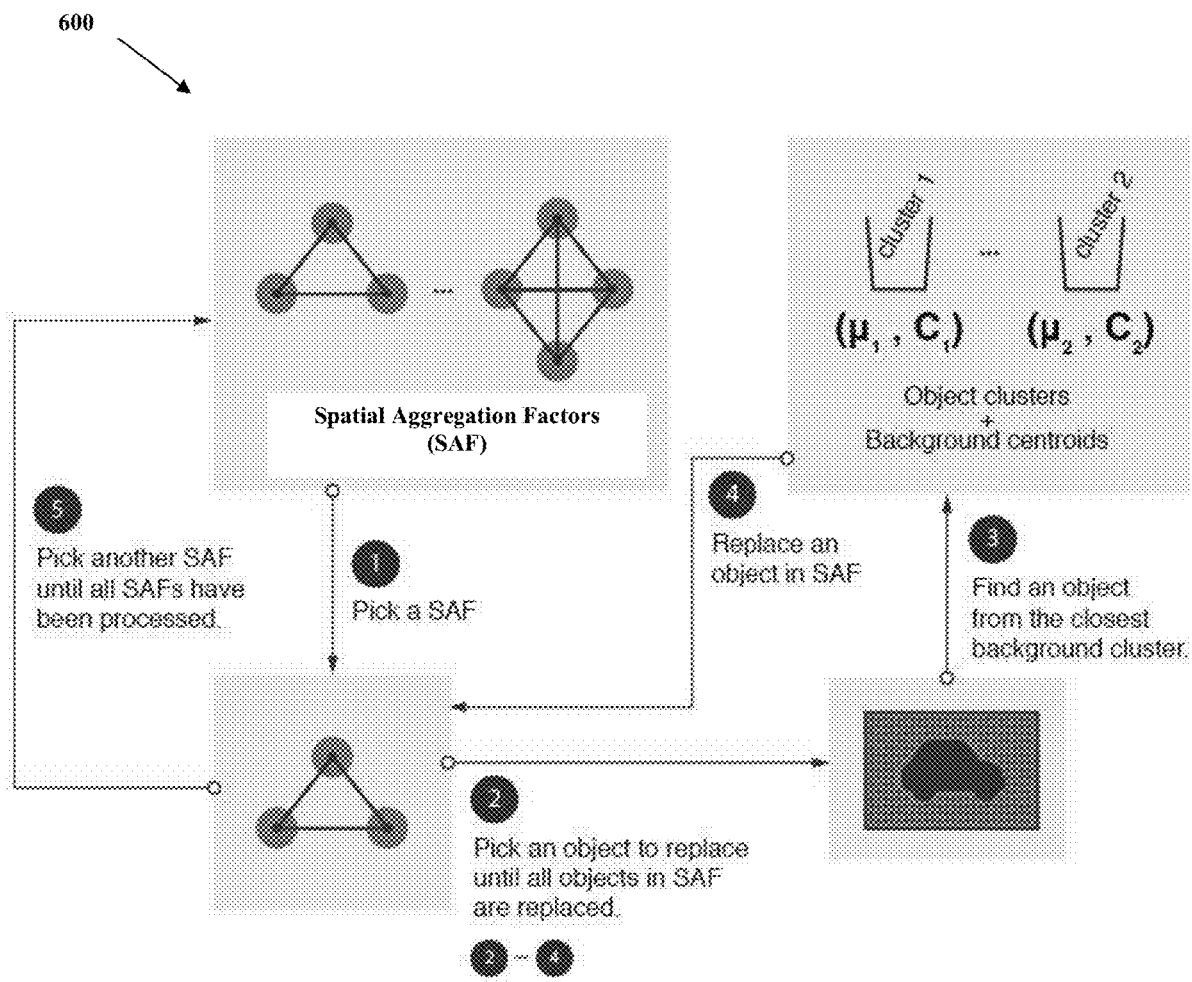
FIG. 6 shows an illustration of the proposed approach for synthetic generation, according to an exemplary embodiment of the invention.

FIG. 6 illustrates the steps involved in generating synthetic images given mined SAFs and clustered background centroids 600. In each SAF there is a finite amount of categories and objects for each of those categories. There is also a limited amount of categories and objects in any given dataset with which synthetics can be generated.

Considering the well-known combinations formula $$C(n, k) = \frac{n!}{(n-k)! \, k!}$$

used to describe how set elements can be combined with no regard to order, we can describe another formula that can be used to calculate the amount of synthetics that can be generated for any given SAF with an existing dataset:

$$\prod_{i}^{N} C_i(n_i, k_i)$$

Where N is the amount of classes present in a chosen SAF, $n_i$ is the amount of objects present in each category $N_i$, and $k_i$ is the amount of objects per category present in a SAF.

Shown above is a method for generating synthetic overhead imagery based on existing datasets. Using the Mahalanobis distance-based K-means clustering to cluster background pixel centroids, we propose using the existing spatial distribution of objects within an existing image to accommodate objects within resulting synthetics. Then, we generate synthetics by replacing objects, buffering their position, and choosing replacement objects from the cluster of objects whose centroid most closely resembles the background pixel mean of the replaced object. Replacing an object with a smaller object results in excess pixels that are filled with the background pixel mean, blended, blurred, or corrected with a synthetic pixel generation technique.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. A computer-implemented method for generating synthetic overhead images by replacing objects from one pre-existing image with objects extracted from a separate and different 2-D overhead satellite imagery and collected into a pool of objects with statistically similar backgrounds, said method comprising:

accessing a satellite image dataset comprised of one or more images, within one or more computer servers, where each said image has a collection of pixels, with each pixel being a precise coordinate within its corresponding image and a function that maps said coordinates to pixel content and each said image has one or more segmentation annotations identifying objects of interest;

wherein, by said one or more computer servers, each segmentation annotation is used to extract a rectangular image for each object in the existing dataset, which encompasses both said object's segmentation (foreground pixels) as well as other nearby background pixels typically considered noise;

wherein all objects in the dataset are clustered according to their background pixel distributions;

generating, by said one or more computer servers, a synthetic image through object replacement from cluster sampling of 2-D objects from an existing dataset, where;

the equivalent of a cluster centroid is assigned to an object being replaced;

the closest cluster is sampled for a qualified replacement object;

using K-means clustering, the similarity in pixel distributions between object backgrounds and clusters is determined by said one or more computer servers using the Mahalanobis distance;

wherein we generate, by said one or more computer servers, a collection of clustered objects based on the background distribution of the entire dataset and specifically:

let $ROIs_k \in ROIs_D$ be a set of k ROIs used for initial cluster centroid computations;

let $Centroid_k = \{(\mu_k, C_k): \mu_k$ is the background pixel mean of each $ROIs_k$ selected for initial centroids and computed as $$\frac{1}{|Background_{fk}|} \sum_{i=0}^{|Background_{fk}|}$$

$F(Background_{fi})$ and $C_k$ its corresponding covariance matrix} be the set of cluster centroids to optimize with K-means clustering; and perform K-means clustering of all object background pixel means using the Mahalanobis distance between each background pixel mean and the proposed centroids to obtain optimized background distribution centroids.

2. The method of claim 1 further comprising;

using at least one satellite image and available object clusters, performing the following process for each object in the image;

selecting one or more qualified objects from the closest background cluster to replace the original object in said image; and filling original object pixels not occupied by said qualified objects with the original background pixel mean, blurred, blended or corrected with a complementing synthetic pixel generator.

3. A non-transitory computer-readable medium embodying a program executable by at least one computing device, the program when executed causing said at least one computing device to do the following:

accessing a satellite image dataset comprised of one or more images, within one or more computer servers, where each said image has a collection of pixels, with each pixel being a precise coordinate within its corresponding image and a function that maps said coordinates to pixel content and each said image has one or more segmentation annotations identifying objects of interest;

wherein, by said one or more computer servers, each segmentation annotation is used to extract a rectangular image for each object in the existing dataset, which encompasses both said object's segmentation (foreground pixels) as well as other nearby background pixels typically considered noise;

all objects in the dataset are clustered according to their background pixel distributions; and generating, by said one or more computer servers, a synthetic image through 2-D object replacement;

where the equivalent of a cluster centroid is assigned to an object being replaced;

the closest cluster is sampled for a qualified replacement object;

using K-means clustering, the similarity in pixel distributions between object backgrounds and clusters is determined by said one or more computer servers using the Mahalanobis distance;

wherein we generate, by said one or more computer servers, a collection of clustered objects based on the background distribution of the entire dataset and specifically;

let $ROIs_k \in ROIs_D$ be a set of k ROIs used for initial cluster centroid computations;

let $Centroid_k = \{(\mu_k, C_k): \mu_k$ is the background pixel mean of each $ROIs_k$ selected for initial centroids and computed as $$\frac{1}{|Background_{Ik}|} \sum_{i=0}^{|Background_{Ik}|}$$

$F(Background_{Ii})$ and $C_k$ its corresponding covariance matrix$\}$ be the set of cluster centroids to optimize with K-means clustering; and perform K-means clustering of all object background pixel means using the Mahalanobis distance between each background pixel mean and the proposed centroids to obtain optimized background distribution centroids.

4. The method of claim 3 further comprising;

using at least one satellite image and available object clusters, performing the following process for each object in the image;

selecting one or more qualified objects from the closest background cluster to replace the original object in said image; and filling original object pixels not occupied by said qualified objects with the original background pixel mean, blurred, blended or corrected with a complementing synthetic pixel generator.

5. A computer-implemented system for generating synthetic overhead imagery by replacing objects from one pre-existing image with objects extracted from a separate and different 2-D overhead satellite imagery and collected into a pool of objects with statistically similar backgrounds, said system comprising:

one or more computer servers hosting a satellite image dataset comprised of one or more images, where each said image has a collection of pixels, with each pixel being a precise coordinate within its corresponding image and a function that maps said coordinates to pixel content and each said image has one or more segmentation annotations identifying objects of interest;

wherein, by said one or more computer servers, each segmentation annotation is used to extract a rectangular image for each object in the existing dataset, which encompasses both said object's segmentation (foreground pixels) as well as other nearby background pixels typically considered noise;

wherein all objects in the dataset are clustered according to their background pixel distributions; and generating, by said one or more computer servers, a synthetic image through object replacement from cluster sampling of 2-D objects from an existing dataset, where;

the equivalent of a cluster centroid is assigned to an object being replaced; and the closest cluster is sampled for a qualified replacement object;

using K-means clustering, the similarity in pixel distributions between object backgrounds and clusters is determined by said one or more computer servers using the Mahalanobis distance;

wherein we generate, by said one or more computer servers, a collection of clustered objects based on the background distribution of the entire dataset and specifically;

let $ROIs_k \in ROIs_D$ be a set of k ROIs used for initial cluster centroid computations;

let $Centroid_k = \{(\mu_k, C_k): \mu_k$ is the background pixel mean of each $ROIs_k$ selected for initial centroids and computed as $$\frac{1}{|Background_{Ik}|} \sum_{i=0}^{|Background_{Ik}|}$$

$F(Background_{Ii})$ and $C_k$ its corresponding covariance matrix$\}$ be the set of cluster centroids to optimize with K-means clustering; and perform K-means clustering of all object background pixel means using the Mahalanobis distance between each background pixel mean and the proposed centroids to obtain optimized background distribution centroids.

6. The system of claim 5 further comprising;

using at least one satellite image and available object clusters, performing the following process for each object in the image;

selecting one or more qualified objects from the closest background cluster to replace the original object in said image; and filling original object pixels not occupied by said qualified objects with the original background pixel mean, blurred, blended or corrected with a complementing synthetic pixel generator.

* * * * *